May 14, 1946. J. J. DUNN 2,400,293
GAUGE
Filed Sept. 22, 1943
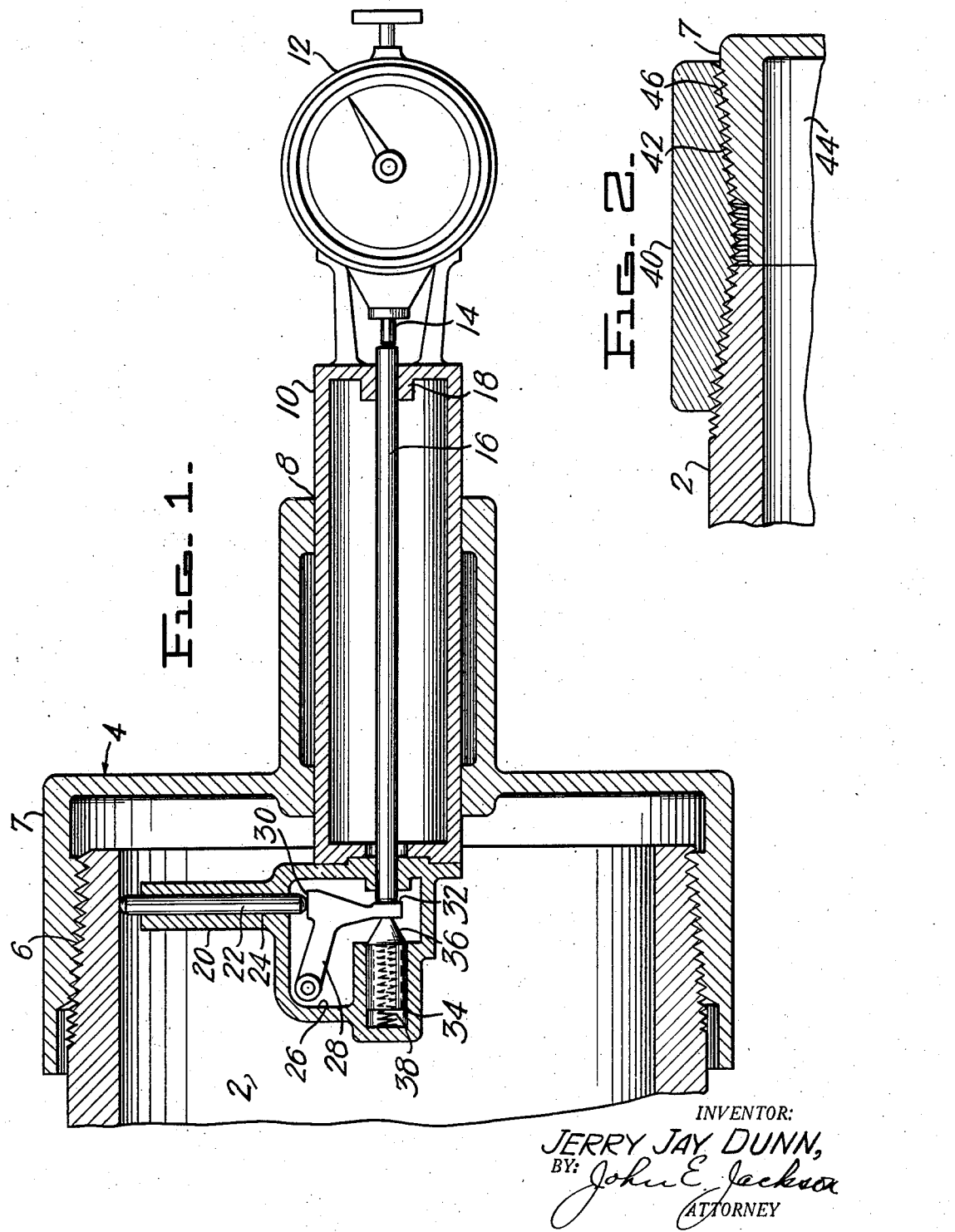
INVENTOR:
JERRY JAY DUNN,
BY: John E. Jackson
ATTORNEY Patented May 14, 1946

2,400,293

UNITED STATES PATENT OFFICE 2,400,293

GAUGE

Jerry Jay Dunn, Ellwood City, Pa., assignor to National Tube Company, a corporation of New Jersey Application September 22, 1943, Serial No. 503,439

6 Claims. (Cl. 33—172)

This invention relates to an improvement in gauges and more particularly to gauges for determining the maximum diameter of a circle that can be inscribed within the threaded section of a tube, the circle having its center in the axis of the threaded section. The wall thickness under the thread on a tube varies considerably from the basic thickness to which the tube is produced. The variation arises from several causes among which are the eccentricity of the bore, the variation in weight, the metal added at welds, etc. It is often important to know the maximum diameter of an article that can pass a tube joint, especially in deep well casings. In this service, drilling bits and various other objects must pass through the joints in the entire length of casing. It is important in the interests of economy that the diameter of these objects be as large as possible without danger of their hanging up in a joint.

It is the object of this invention to provide a gauge for determining the dimensions necessary for calculating the probable maximum safe diameter of an article passing through a tube joint.

This and other objects will be more apparent after referring to the following specification and attached drawing, in which:

Figure 1 is a view showing the gauge in place on a threaded tube; and

Figure 2 is a fragmentary view showing the means for fastening the gauge to a tube having a coupling threaded thereto.

Referring more particularly to the drawing, the reference numeral 2 indicates the threaded end of a tube whose variations in internal diameter is to be gauged. A centering jig 4 having threads 6 on the flange 7 which engage the threads of the tube 2 has a bore 8 for receiving the carriage 10. The axis of the bore 8 and the carriage 10 coincides with the axis of the threaded section of the tube. A gauge 12 is mounted on the outer end of the carriage 10 and has an anvil 14 which is actuated by means of a rod 16 slidably mounted in bearings 18 on the carriage 10. The inner end of the carriage 10 has a member 20 fastened thereto. A plunger 22 is mounted for sliding movement in a bore 24 in the member 20, the center line of the bore 24 being on a radius of the threaded section of the tube. Mounted within a chamber 26 in the member 20 is a lever 28 having surface 30 which contacts the inner end of the plunger 22. Another surface 32 of the lever contacts the rod 16. Mounted within a bore 34 in the member 20 is a plunger 36 which is urged against the lever 28 by means of the spring 38, this holding the lever in engagement with the plunger 22 and rod 16.

The operation of the device is as follows:

A jig 4 is screwed on the threads of the tube 2, thus locating the axes of the rod 16 and the carriage 10 on the axis of the threaded portion of the tube. After the jig has been threaded in position, the plunger 22 will contact the inner surface of the tube and any movement of the plunger will be transmitted through the lever 28 and the rod 16 to the gauge 12. The lever 28 may be designed so that the movement along the radius is exactly proportional to the movement along the axis, but, if desired, the dimensions may vary from exact proportionality without detracting from the usefulness of the measurements. The dial gauge 12 may be replaced by a micrometer screw or other device for measuring the movement of the rod 16 along the axis of the thread. The carriage 10 is rotatable about its axis and movable along its axis so that the plunger 22 may be brought into contact with any part of the inside surface of the tube and the distance of that part of the surface from the axis of the threaded surface determined by reading the measuring device.

In order to translate the gauge readings into diameter or wall thickness, a standard calibration unit consisting of a threaded cylinder, the threads of which are duplicates of the threads on the tube which is to be measured and having a concentric bore of known diameter is used. To calibrate the gauge, the jig is screwed tightly on the calibration unit and the plunger 22 brought into contact with the surface of the concentric bore and the reading of the measuring device noted. This reading corresponds to the diameter of the bore and after calibration, the reading recorded for a tube to which the gauge is applied, will be that for the difference between the diameter of the bore of the calibration unit and that of the tube being measured. Hence, the diameter sought becomes known. By noting a few readings of the gauge the minimum diameter is determined and located relatively to a point on the circumference on the outside of the tube surface.

Ordinarily, the diameter of the drilling bit or other objects to be passed through the tube are fixed with the conditions of intended use. This diameter being known, the gauge can be used to determine whether or not a given length of tube can be placed in service.

In many instances, the tube is furnished with a coupling attached and the jig 4 cannot be used without removing the coupling from the tube. To eliminate the necessity of removing the coupling, the modified jig shown in Figure 2 is used. The coupling 40, having female threads 42, is screwed on the tube 2. The jig 44, instead of having female threads 6 on its flange 7, is provided with male threads 46 for engaging the threads 42 of the coupling 40. In all other respects the gauge is identical with the gauge shown in Figure 1.

While two embodiments of the invention have been shown and described, it will be apparent that other adaptations and modifications may be made without departing from the scope of the following claims.

I claim:

1. A gauge for determining the maximum diameter of a circle that can be inscribed within the threaded section of a tube having its center in the axis of the threaded section which comprises a centering jig adapted to engage the threads of the threaded section of the tube to maintain its axis in coincidence with the axis of the threaded section, an elongated sleeve in said jig, a carriage mounted in said sleeve for rotation about the axis thereof, a gauge on the outer end of said carriage, a radial plunger on the inner end of said carriage adapted to contact the inner surface of said tube, and means for transmitting the radial movement of said plunger to said gauge.

2. A gauge for determining the maximum diameter of a circle that can be inscribed within the threaded section of a tube having its center in the axis of the threaded section which comprises a centering jig adapted to engage the threads of the threaded section of the tube to maintain its axis in coincidence with the axis of the threaded section, an elongated sleeve in said jig, a carriage mounted in said sleeve for rotation about the axis thereof and for sliding movement longitudinally thereof, a gage on the outer end of said carriage, a plunger adapted to contact the inner surface of said tube, a rod in said carriage extending from said gauge to a point adjacent said plunger, and means for transmitting the movement of said plunger to said rod to thereby actuate said gauge.

3. A gauge for determining the maximum diameter of a circle that can be inscribed within the threaded section of a tube having its center in the axis of the threaded section which comprises a centering jig adapted to engage the threads of the threaded section of the tube to maintain its axis in coincidence with the axis of the threaded section, an elongated sleeve in said jig, a carriage mounted in said sleeve for rotation about the axis thereof and for sliding movement longitudinally thereof, a gauge on the outer end of said carriage, a plunger adapted to contact the inner surface of said tube, a rod extending along the axis of said carriage having one end in contact with said gauge and the other end adapted to be actuated by the movement of said plunger.

4. A gauge for determining the maximum diameter of a circle that can be inscribed within the threaded section of a tube having its center in the axis of the threaded section which comprises a centering jig adapted to engage the threads of the threaded section of the tube to maintain its axis in coincidence with the axis of the threaded section, an elongated sleeve in said jig, a carriage mounted in said sleeve for rotation about the axis thereof and for sliding movement longitudinally thereof, a gauge on the outer end of said carriage, a plunger adapted to contact the inner surface of said tube, a lever in said carriage bearing against the inner end of said plunger, a rod extending along the axis of said carriage having one end in contact with said gauge and the other end in contact with said lever whereby movement of said plunger is transmitted to said gauge.

5. A gauge for determining the maximum diameter of a circle that can be inscribed within the threaded section of a tube having its center in the axis of the threaded section which comprises a centering jig adapted to engage the threads of the threaded section of the tube to maintain its axis in coincidence with the axis of the threaded section, an elongated sleeve in said jig, a carriage mounted in said sleeve for rotation about the axis thereof and for sliding movement longitudinally thereof, a gauge on the outer end of said carriage, a radial plunger adapted to contact the inner surface of said tube, a lever in said carriage bearing against the inner end of said plunger, a rod extending along the axis of said carriage having one end in contact with said gauge and the other end in contact with said lever, and means for urging said lever into contact with said radial plunger and said rod whereby movement of said radial plunger is transmitted to said gauge.

6. A gauge for determining the maximum diameter of a circle that can be inscribed within the threaded section of a tube having its center in the axis of the threaded section which comprises a centering jig adapted to engage the threads of the threaded section of the tube to maintain its axis in coincidence with the axis of the threaded section, an elongated sleeve in said jig, a carriage mounted in said sleeve for rotation about the axis thereof and for sliding movement longitudinally thereof, a gauge on the outer end of said carriage, a radial plunger adapted to contact the inner surface of said tube, a lever in said carriage bearing against the inner end of said plunger, a rod extending along the axis of said carriage having one end in contact with said gauge and the other end in contact with said lever, and a spring pressed plunger urging said lever into contact with said radial plunger and said rod whereby movement of said radial plunger is transmitted to said gauge.

JERRY JAY DUNN.